United States Patent [19]
Sarangapani

[11] Patent Number: 6,119,074
[45] Date of Patent: Sep. 12, 2000

[54] METHOD AND APPARATUS OF PREDICTING A FAULT CONDITION

[75] Inventor: Jagannathan Sarangapani, Peoria, Ill.

[73] Assignee: Caterpillar Inc., Peoria, Ill.

[21] Appl. No.: 09/082,391

[22] Filed: May 20, 1998

[51] Int. Cl.$^7$ ................................................. G05B 15/00
[52] U.S. Cl. ........................... 702/185; 702/182; 702/179; 701/1; 701/29
[58] Field of Search ................................... 702/185, 187, 702/179, 182, 181; 701/26, 1, 35; 700/29; 340/870.01, 901, 500, 514, 517

[56] References Cited

U.S. PATENT DOCUMENTS

| | | | |
|---|---|---|---|
| 5,463,567 | 10/1995 | Boen et al. | 702/187 |
| 5,561,610 | 10/1996 | Schricker et al. | 702/185 |
| 5,737,215 | 4/1998 | Schricker et al. | 700/29 |
| 5,752,207 | 5/1998 | Sarangapani | 701/26 |
| 5,950,147 | 9/1999 | Sarangapani | 702/179 |

*Primary Examiner*—Kamini Shah
*Attorney, Agent, or Firm*—David M. Masterson

[57] ABSTRACT

An apparatus for predicting a fault condition for a machine is disclosed. The machine has a plurality of parameters being dependent upon machine performance. A sensor connected to the machine produces an electrical signal in response to one of the plurality of machine parameters. A computer produces a data trend of the parameter in response to the electrical signal, calculates the duration and slope of the trend, and predicts the time period in which the trend will exceed the warning level.

6 Claims, 7 Drawing Sheets

METHOD AND APPARATUS OF PREDICTING A FAULT CONDITION

TECHNICAL FIELD

The invention relates generally to a device for predicting a fault condition, and more particularly, to a method and apparatus for predicting a fault condition in response to the trend of a machine parameter.

BACKGROUND ART

For service and diagnostic purposes, machines are sometimes equipped with sensors for measuring operating conditions such as engine RPM, oil pressure, water temperature, boost pressure, oil contamination, electric motor current, hydraulic pressure, system voltage, and the like. In some cases, storage devices are provided to compile a data base for later evaluation of machine performance and to aid in diagnosis. Service personnel may examine the accrued data to get a better understanding of the causes of any machine performance degradation, wear, or failure. Similarly, service personnel may evaluate the stored data to predict future failures and associated collateral damages, and to correct any problems before total component failure.

In addition, these stored parameters may be examined by service or supervisory personnel to evaluate machine and/or operator performance to ensure maximum productivity of the machine. These issues are particularly pertinent to over-the-highway trucks and large work machines such as off-highway mining trucks, hydraulic excavators, track-type tractors, wheel loaders, and the like. These machines represent large capital investments and are capable of substantial productivity when operating. It is therefore important to predict significant performance loss, wear and catastrophic failures so servicing can be scheduled during periods in which productivity will be less affected and so minor problems can be repaired before they lead to catastrophic failures.

Similarly, it is sometimes advantageous to accumulate parameters only when the machine is in a particular operating condition. This type of information is predominantly used during performance evaluation but may also be used in failure diagnosis and prognosis. For example, the length of time spent in a particular gear while the machine is loaded may be needed to evaluate machine performance.

The present invention is directed to overcoming one or more of the problems set forth above.

DISCLOSURE OF THE INVENTION

An apparatus for predicting a fault condition for a machine is disclosed. The machine includes a plurality of parameters being dependent upon machine performance. A sensor produces an electrical signal in response to one of the plurality of machine parameters. A computer produces a data trend of the parameter in response to the electrical signal, calculates a confidence value of the machine parameter, the confidence value representing the degree of certainty that a failure has been detected, assigns a weight to the machine parameter, the weight representing the degree of certainty that the machine parameter is the root cause of the failure, multiplies the confidence value by the associated weight of the parameter value, compares the overall confidence value to a plurality of limit values where each limit value is associated with a particular parameter, and determines the cause of the failure in response to the overall confidence value corresponding to a particular set of limit values.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
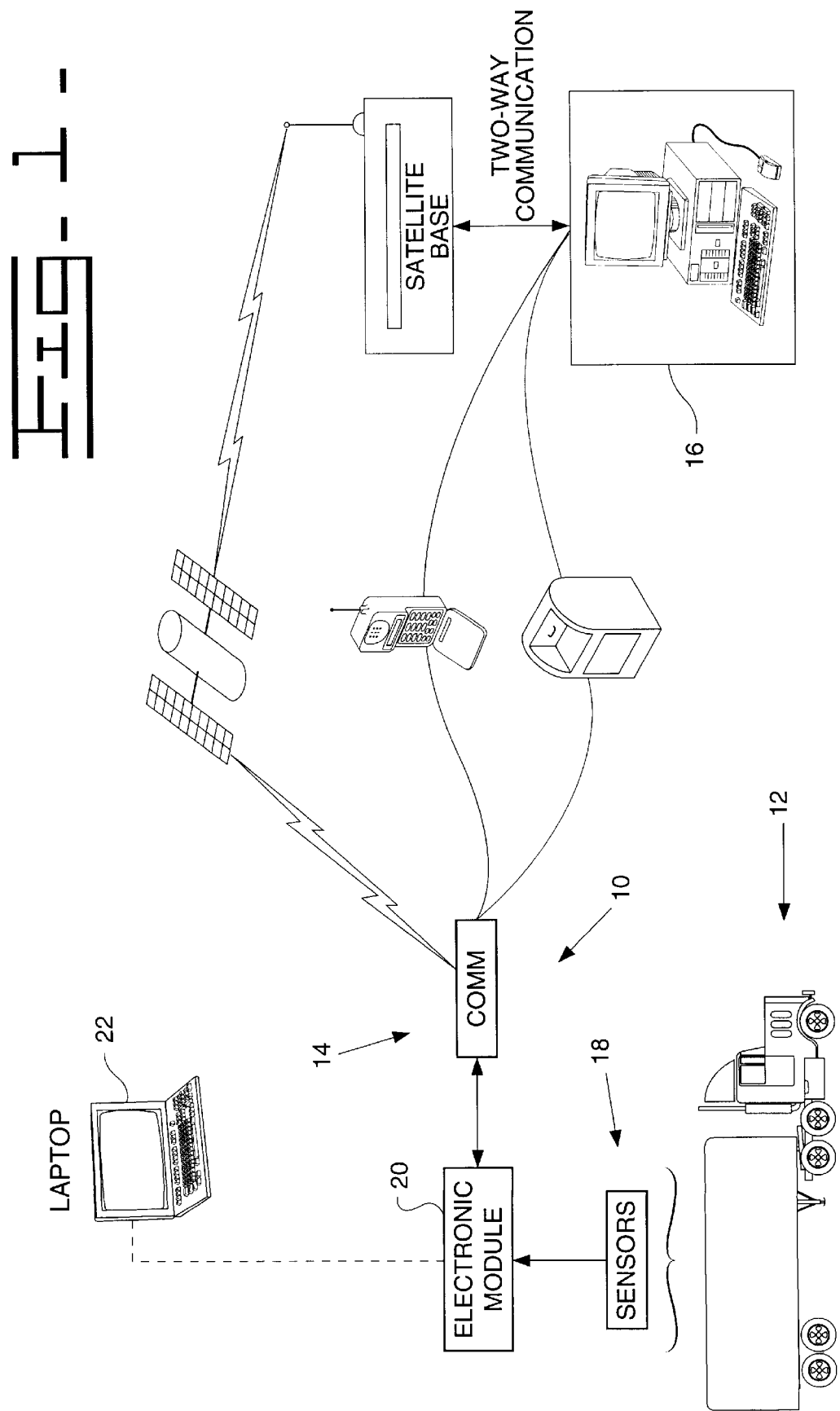
FIG. 1 illustrates a high level diagrammatic illustration of a machine prognostic system.

Referring to FIG. 1, a machine prognostic system is shown generally by the number 10 and is a data acquisition, analysis, storage, and display system for a work machine 12. Employing a complement of on-board and off-board hardware and software, the machine prognostic system 10 monitors and derives machine component information and analyzes the resulting data to indicate and/or predict a machine fault, i.e., an impending component or system failure.

FIG. 1 illustrates a variety of potential communication systems 14 that may be used to transfer data from the work machine 12 to a central computer system 16 for analysis. For example, the data may be transferred by a satellite system back to the central computer system 16. Alternatively, the data may be transferred by a cellular telephone system or by storing data on a computer disk which is then mailed to the central computer site for analysis.

It should be understood that all aspects of the present invention could be located on-board the work machine 12 thereby eliminating the need for a communication system 14; however, the central computer system 16 allows an entire fleet to be monitored at a central location.

Subsets of the data are also transmitted to a display module (not shown) in the operator compartment of the work machine 12 for presentation to the operator in the form of gauges and warning messages. During normal operation, gauge values are displayed in the operator compartment. During out-of-spec conditions, alarms and warning/instructional messages are also displayed.

In the preferred embodiment, sensed data is directly sampled by sensors 18 of a type well-known in the art for producing electrical signals in response to the level of operational parameters and includes pulse-width modulated sensor data, frequency-based data, five volt analog sensor data, and switch data that has been effectively debounced. The sensors are connected to an electronic module 20 for delivery of the sensor signals.

Figure 2:
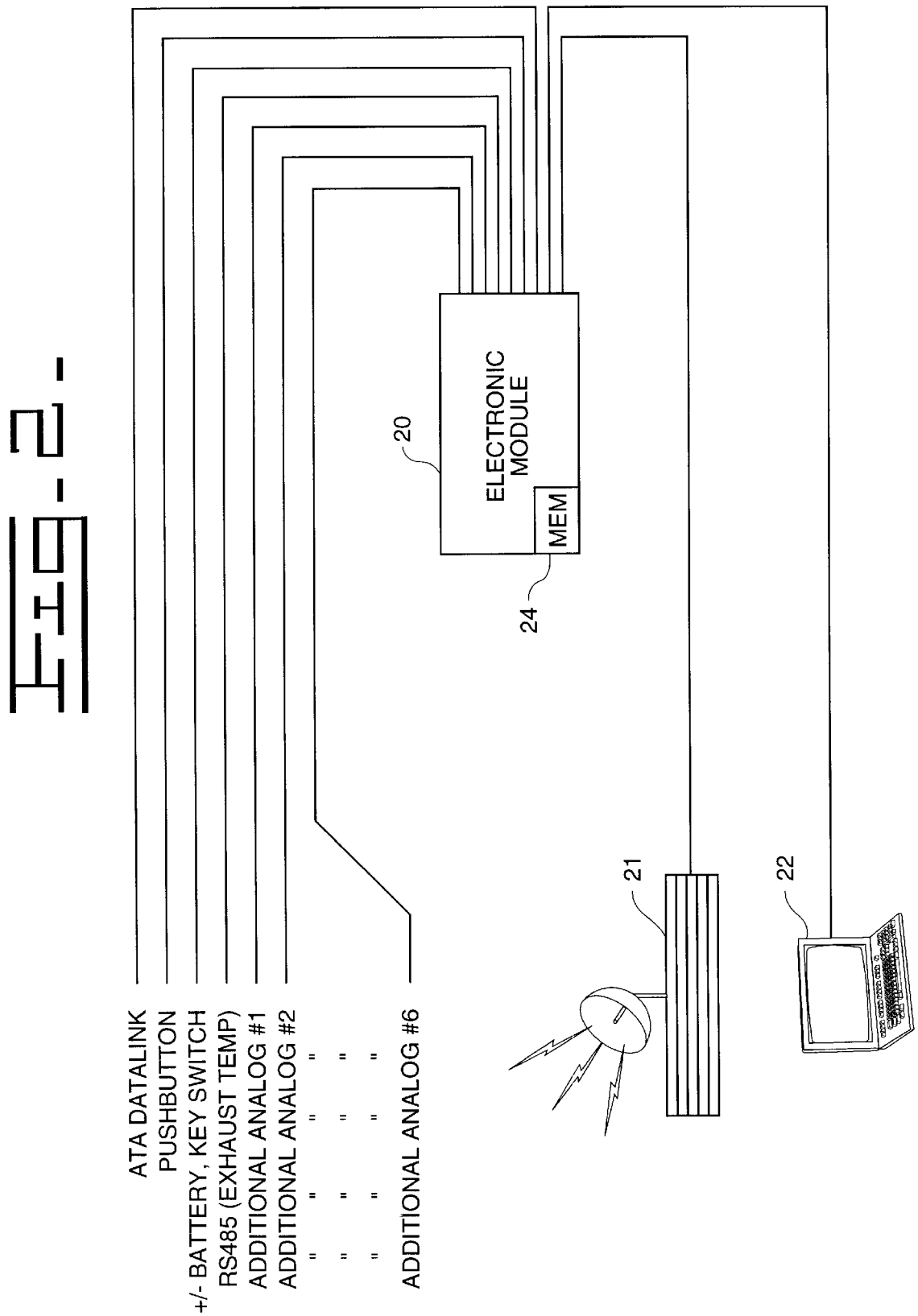
FIG. 2 illustrates a plurality of machine parameter connections to an electronic module of the machine prognostic system.

In the embodiment of FIGS. 1 and 2, the sensor signals are delivered to the electronic module 20 by either direct connection of analog sensors, connection by way of an RS485 link, or over a datalink governed by SAE specifications J1587 and J1708. A push-button is also included to trigger the acquisition of a snapshot of data. Connection is also provided from the machine battery and key switch to the electronic module 20.

In the preferred embodiment, the electronic module 20 includes a microprocessor, a lower level communications board (not shown) of a type well-known in the art, and a memory section 24 including high level flash memory and battery backed RAM. The electronic module also includes a pair of RS232 connections, one being available for connection to the satellite communications system 21 and the other being available for connection to an off-board computer 22 used in download of data and initialization of the system. In the preferred embodiment, the off-board computer 22 is a laptop personal computer.

To document the performance of the machine and/or its major components, performance baselines are stored in an array within the memory device located in the electronic module 20. These baselines are used during key, repeatable performance checks of the machine to help verify machine/component health and, as discussed below, are used as reference points to determine whether the machine is in an operating condition in which machine parameters are to be processed and stored.

A subset of parameters for which trend data is to be produced is either predefined or defined via the off-board computer 22 or the central computer 16. Each parameter includes a dependency definition that identifies the conditions under which data will be stored for trending purposes. Typically, the dependency definition is selected to indicate the normal operating conditions of the machine; for example, when engine RPM or boost pressure are above a predetermined levels. The trending definition for each parameter may vary and may be a function of several other machine parameters that shall be referred to as dependencies. Trend data is gathered and stored in memory as the specified dependency definition is met over a specified trend period, which is measured either in time, such as over a period of ten hours, or in counts, such as over a period of ten transmission shifts. Trend data is only obtained while the engine is running. Based on the specified trend type, the maximum, minimum, or cumulative value of data gathered during this period is then stored as a single trend point with counts to determine the average value and/or the points available. The determination of whether to use the average, maximum, or minimum value to obtain the trend point is based on the system designer's decision regarding which type of calculation would provide the best indication of changes in engine performance or impending failures. It should also be understood that multiple values could be calculated for the same sensed parameter, i.e., trend points could be calculated to indicate both an average value and a minimum value for a designated machine parameter.

Figure 3:
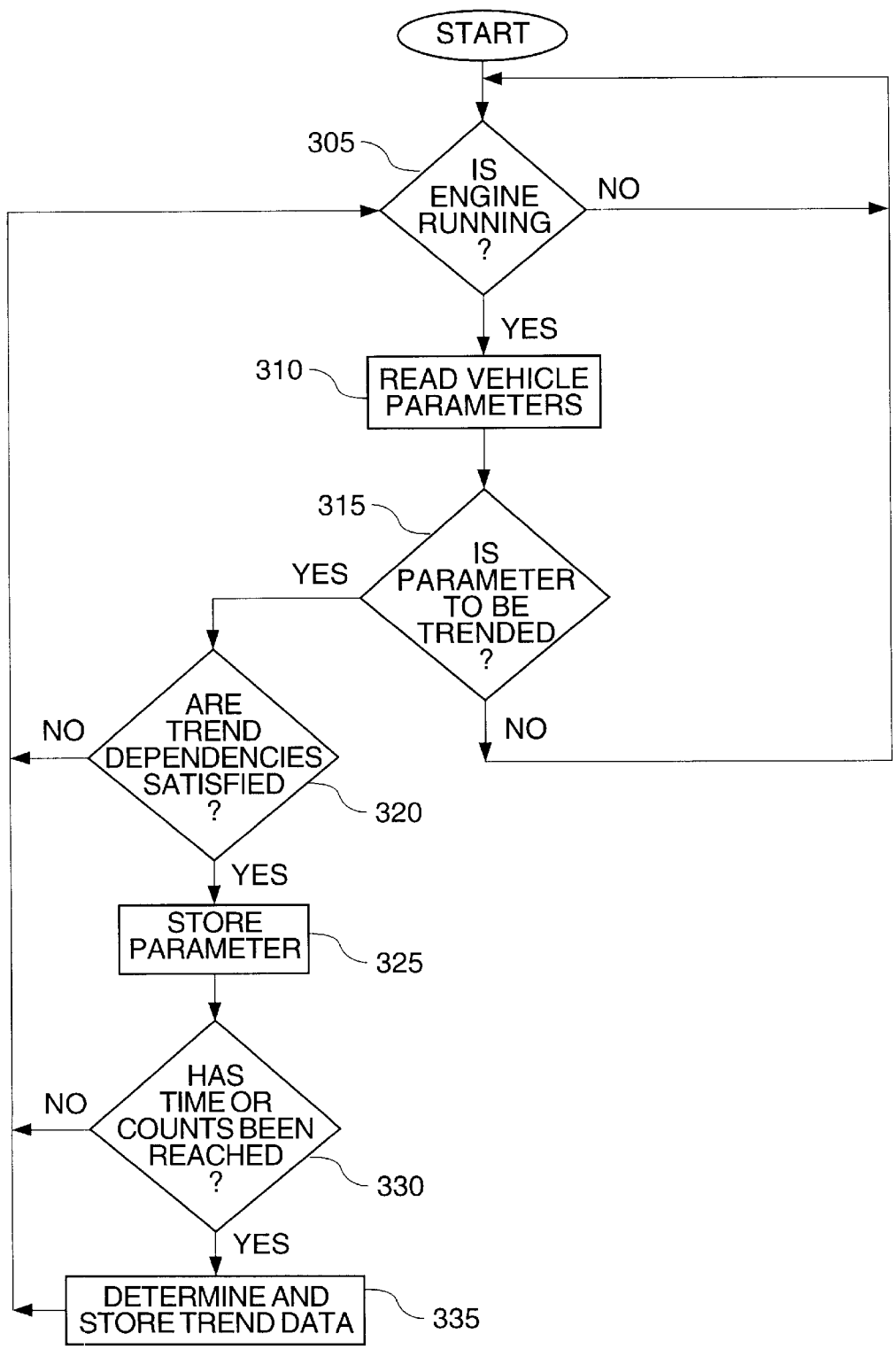
FIG. 3 illustrates a method performed by the electronic module to trend machine parameters.

Referring now to FIG. 3, one method executed by the processor within the electronic module 20 to perform the above functions is now described. The electronic module 20 first determines whether the engine is running, ash shown by block 305. For example, the engine is determined to be running if engine speed exceeds cranking engine speed. If the engine is not running, then the method will not proceed. If the engine is running, the electronic module 20 reads the sensed machine parameters from the datalink or other inputs, as per block 310.

In accordance with block 315, the electronic module 20 determines whether the sensed parameter is to be processed to provide trend data. If trend data is to be provided, then the method proceeds to block 320 where the trending definition is retrieved and the dependency parameters are checked to determine whether the dependency definition is satisfied. The dependency definition for each operating parameter of interest is defined in terms of other sensed machine parameters. For example, the dependency definition for boost pressure may be satisfied only when engine RPM is greater than a low operating speed and less than a high operating speed, when the engine rack setting is greater than a predetermined level, and when the jacket water temperature is greater than a predefined operating temperature. That is, values for boost pressure are only saved and processed for producing trend information when the above conditions are satisfied. In this way, all boost pressure values used to produce the trend data will have been acquired when the engine is in the same general operating condition. It should be understood that the actual ranges, minimums, and maximums used in the dependency definitions are determined empirically to define the operating conditions of interest and will vary from machine to machine and application to application.

If the dependency definition is satisfied, the method proceeds to block 325 where the value of the sensed parameter is stored. This process is continued in accordance with block 330, until either the time period over which each trend point is to be determined or the number of events for which each trend point is to be determined is reached at which point the electronic module 20 calculates and stores the trend point. The time period or number of events is selected in response to the designer's desire for precision, the availability of memory space in the memory device, and the length of time or number of counts required to obtain meaningful trend points. The calculation of the trend point may include accumulating the stored values, selecting the maximum stored value, or selecting the minimum stored value. The calculated trend point is saved in accordance with block 335 and the data array for that parameter is then cleared to allow for the storage of data for calculation of the next trend point for that parameter.

Figure 4:
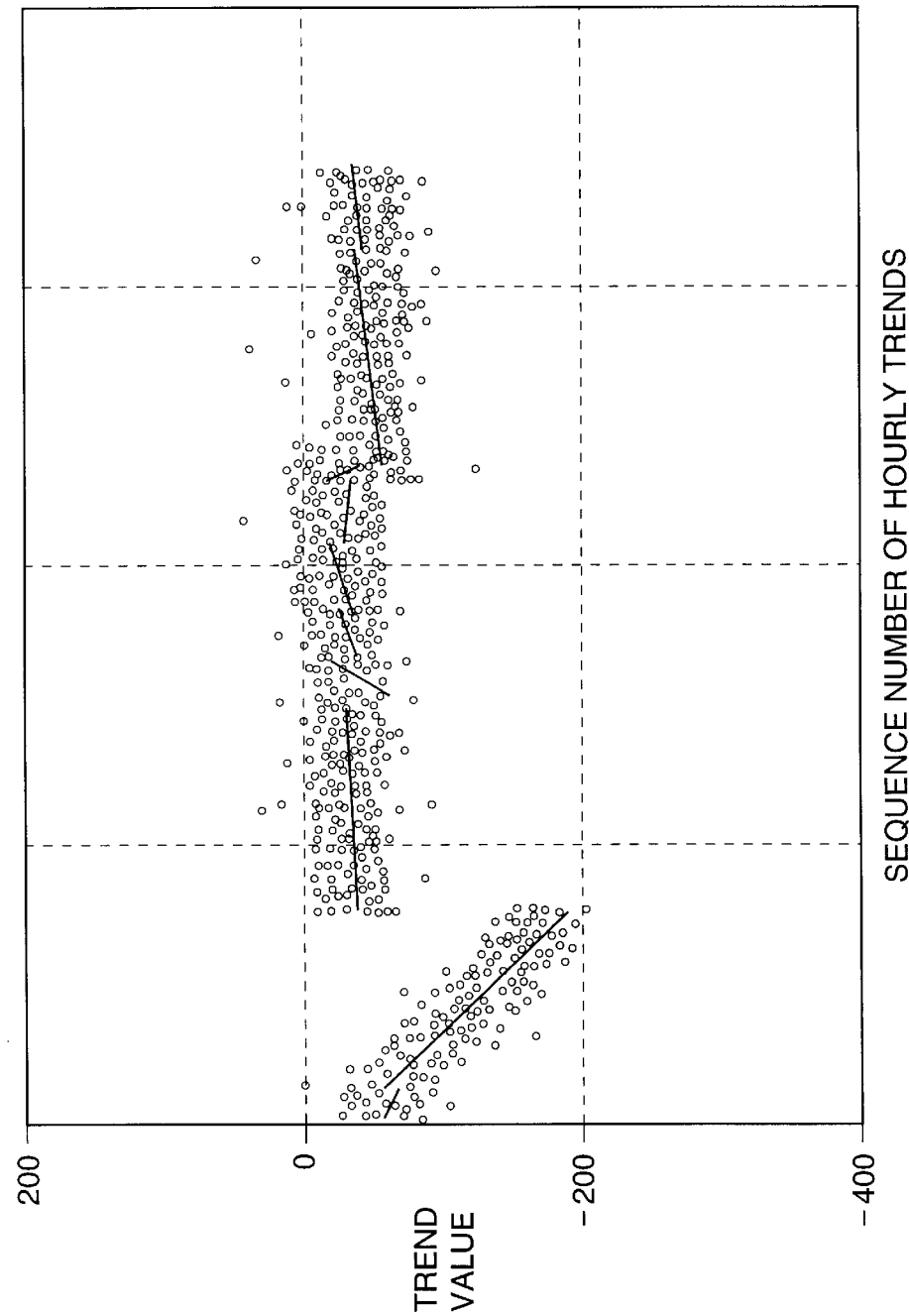
FIG. 4 illustrates an example of a machine parameter trend.

Trend data obtained by way of the method of FIG. 3 is illustrated in FIG. 4. While the illustrated data has a substantial variance, straight lines can be fit to the data to illustrate the general trend of the data by known curve fitting techniques, such as the least-squares method. The overall trend is formed by storing a specified number of points in the memory device depending on the size of the available memory area and the length of the desired historical data base.

In addition to the trend data produced for sensed parameters, it should be understood that calculated values, such as net horsepower or driveline torque, may also be trended in a similar manner. Typically, these calculated values are determined by the electronic module 20 according to predetermined definitions in response to a plurality of sensed parameter signals.

Trend data may be reset and the definitions may be redefined by the off-board system 22 via one of the communication ports. For example, if a particular application of the machine requires a different dependency definition for one or more of the sensed parameters, the off-board system 22 is used to modify the dependency definition by providing commands to erase a given array including a given dependency definition and replace that definition with a new dependency definition. Similarly, this function may be performed by the central computer system 16 via the communication system 14.

Figure 5:
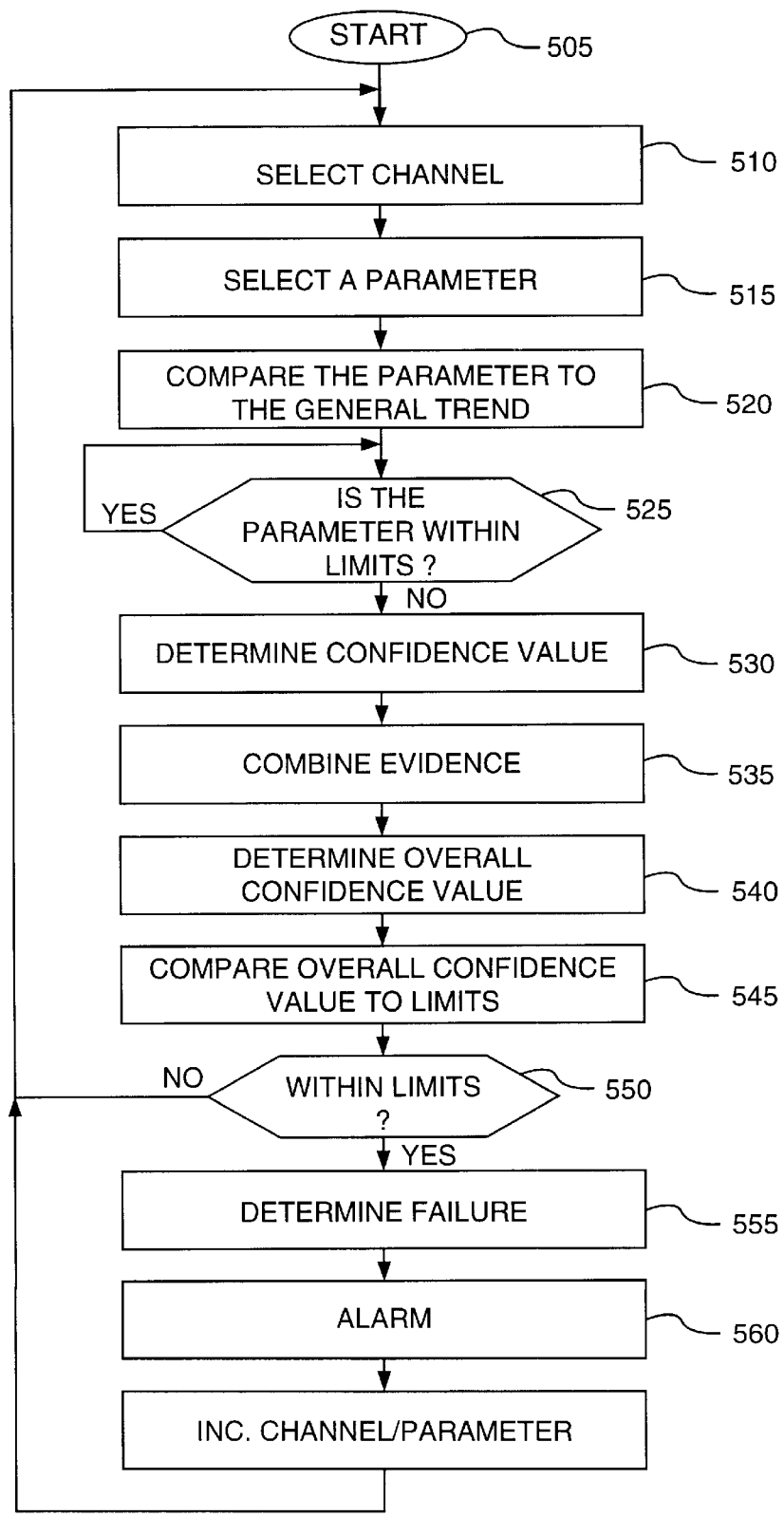
FIG. 5 illustrates a method for determining a cause of a machine fault.

The present invention is directed toward providing a method for combining several sensed parameters, along with the parameter's corresponding trend data, to obtain a root cause of a potential failure or problem of a component or system associated with the machine. Reference is not made to the flow chart illustrated on FIG. 5 which shows the logical flow diagram 500 of the preferred embodiment of the present invention. In block 505, the method executed by the processor within the electronic module 20 initiates, where upon the electronic module 20 selects an appropriate channel and parameter to be evaluated, indicated by blocks 510,515. The electronic module 20 then compares the actual value of the sensed parameter to the associated general trend of the parameter, and determines a delta value of the sensed parameter in response to the difference between the actual value and the general trend, as indicated by block 520. The method proceeds to decision block 525 where the electronic module 20 determines whether the delta value is within an upper and lower set of limits. If the parameter is determined to exceed either the upper or lower set of limits, then the method proceeds to block 530 where the electronic module 20 calculates a confidence value of the sensed parameter. A confidence value represents the degree of certainty that a failure has been detected and is determined empirically or mathematically based on a membership function. For example, the electronic module 20 may calculate the confidence value in accordance with the following equation:

$$\mu_i(x) = \frac{1}{e^{-x}+1}$$

where $\mu$=a membership function i=a channel x=parameter

Once the electronic module 20 has calculated the confidence value, then the method proceeds to block 535 where the electronic module 20 combines predictive information associated with the sensed parameter. For example, the electronic module 20 multiples the confidence value by the associated weight of the parameter in the following manner:

$$\Sigma w_i \mu_i(x)$$

where w=weight

The weight is an empirical value that represents the degree of certainty that the presence of the parameter will contribute to the root cause of the failure. Because each channel may include one or more sensed parameters, predictive information associated each parameters is combined together all in the same manner. Thereafter, the method proceeds to block 540 where the electronic module 20 determines an overall confidence value. The overall confidence value represents the degree of certainty that a failure has been detected by the particular channel. The overall confidence value may be determined by the following equation:

$$\frac{\sum w_i \mu_i(x)}{\sum w_i}$$

Once the overall confidence value has been determined, the method proceeds to block 545 where the electronic module 20 compares the overall confidence value to a plurality of limit values where each limit value is associated with a particular parameter. If the overall confidence value is found to correspond to a particular set of limit values shown by decision block 550, then the cause of the failure may be said to correspond to the particular parameter associated with the set of limit values. Once a failure has been determined in accordance with block 555, then a warning message may be generated, represented by block 560. Additionally, if an earlier warning message had to be generated regarding another parameter, then the present invention may additionally suppress the earlier warning message if the more recent date suggests that a different parameter may be causing the problem.

Industrial Applicability

The present invention is directed toward determining a particular cause, i.e., root cause, of a fault by combining information obtained from various sensed parameters of the machine. An example of the operation of the present invention is shown with respect to a fault logic diagram of FIG. 6, which represents an example condition of a fault that may occur if a clamp for a turbocharger of the machine engine is loose. In this example, the illustrated channel consists of three sensed parameters: intake manifold pressure, exhaust temperature and turbocharger aftercooler efficiency. Block 605 represents the calculated delta value of the sensed parameter, block 610 represents an upper and lower limit that is associated with the sensed parameter, block 615 represents the confidence value of the sensed parameter, and block 620 represents the weighting value of the sensed parameter. As described above, the method multiplies the confidence value of each sensed parameter by the parameter weighting value, then combines the associated product of each sensed parameter at summing junction 625. Thereafter, in block 630, the confidence value is determined and compared to the parameter limits in block 635. For example the parameter limits may include:

0.2 to 0.4 for the intake manifold pressure;

0.4 to 0.7 for the after cooler efficiency; and 0.7 to 1.0 for the exhaust temperature.

In this example, an overall confidence value of 0.37 corresponds to the limits of the intake manifold pressure. This represents a potential failure of the intake manifold pressure sensor, which may be used to alert the operator of the machine via a visible or audible alarm, shown by block 640 which illustrates a root cause of a failure, i.e., failure of a intake manifold pressure sensor caused by an engine turbo charger intake clamp being loose.

Figure 6:
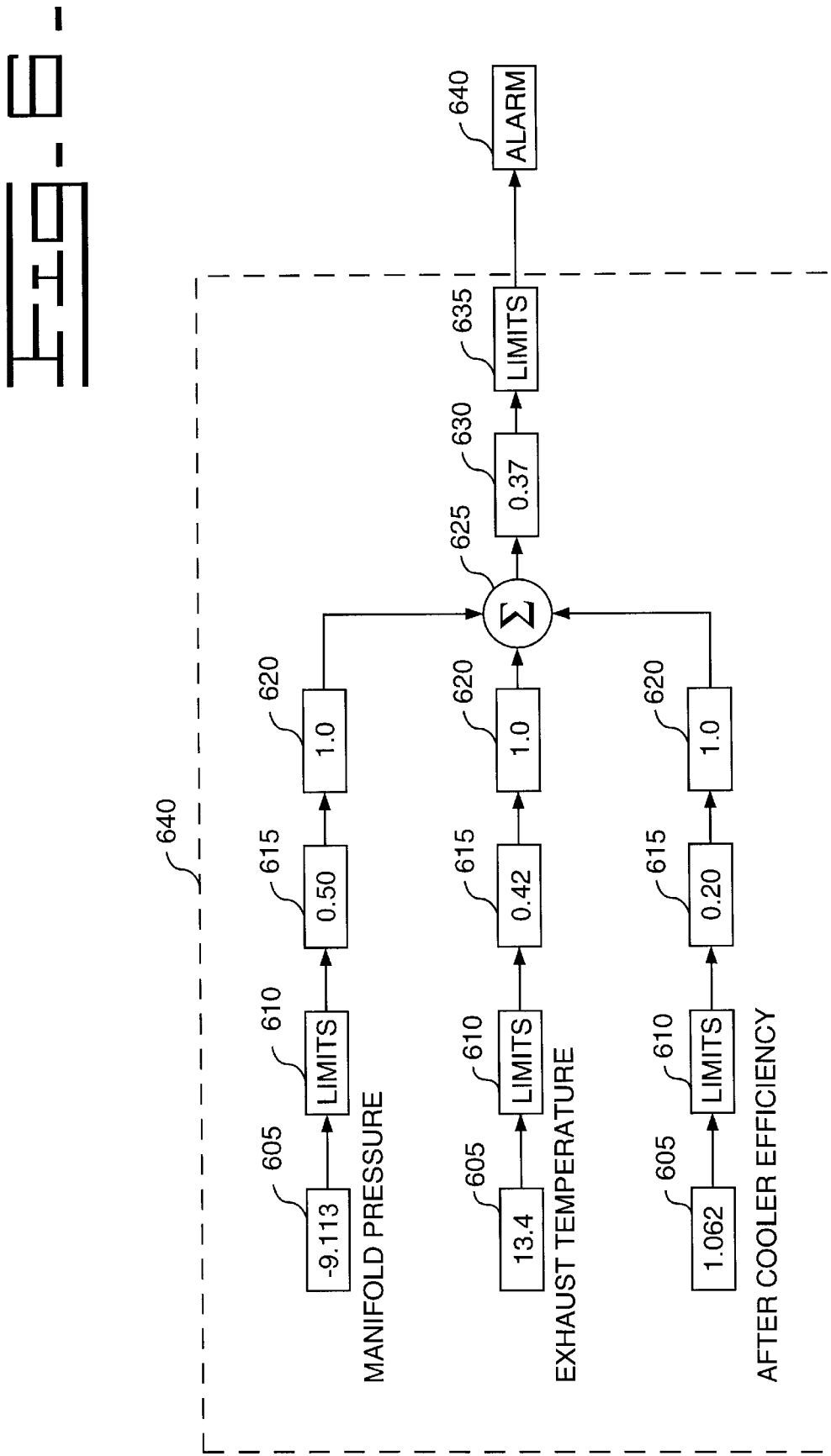
FIG. 6 illustrates a fault logic diagram for determining a potential cause of a machine fault over a single channel.
Figure 7:
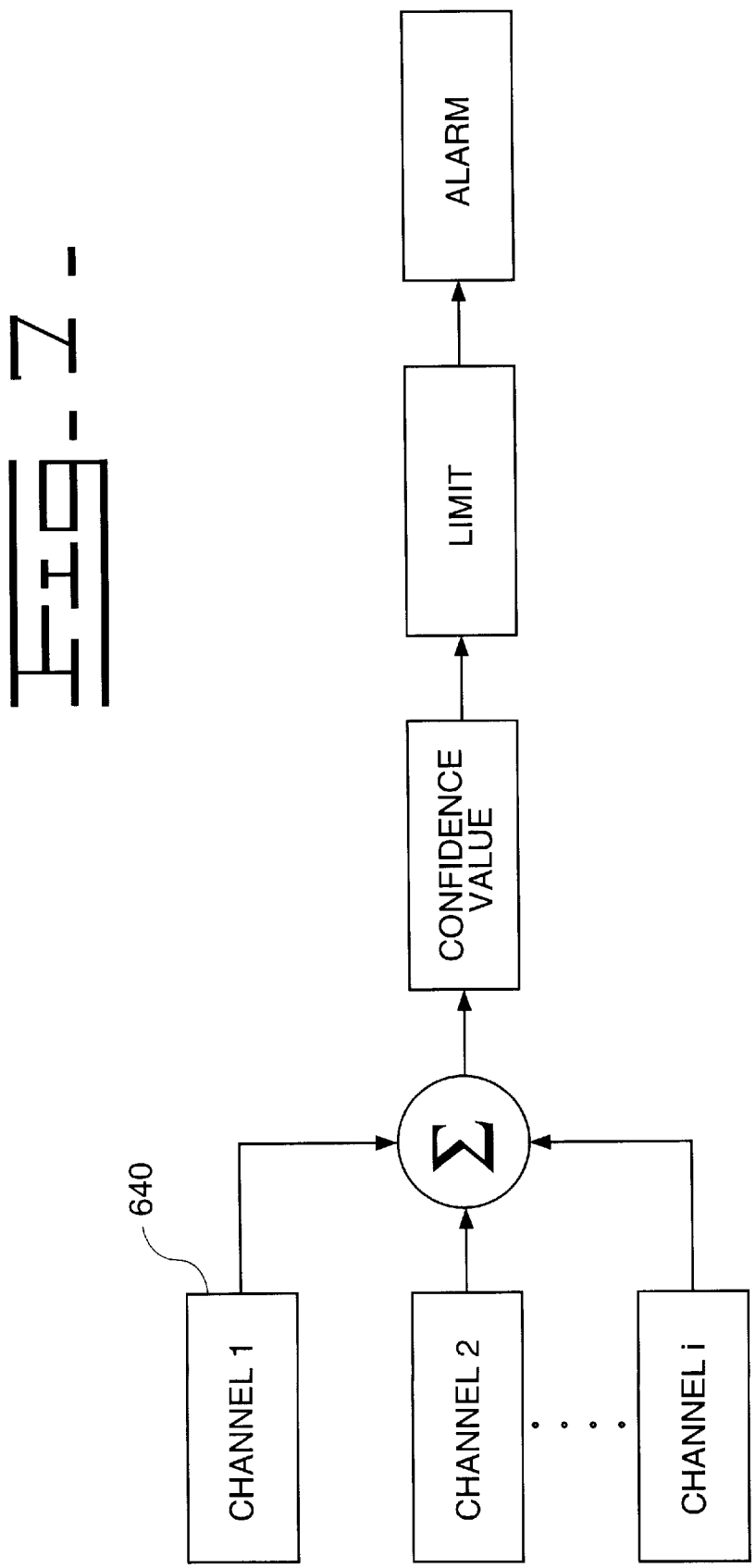
FIG. 7 illustrates a fault logic diagram of determining a potential cause of a machine fault over a plurality of channels.

A particular failure of failure made can be determined by a single fault logic diagram, like that illustrated in FIG. 6, or a failure made can be determined by a plurality of fault logic diagrams each corresponding to a unique failure made. This is illustrated in FIG. 7, where a plurality of fault logic diagrams are combined to form a super fault logic diagram where each of the individual fault logic diagrams may be combined in multiple ways to isolate a root cause of a specific fault.

Work machines such as over-the-highway trucks and large mining and construction machines represent large capital investments and significantly reduce overall productivity for the owner when they are being repaired. To reduce the loss of productivity, service and supervisory personnel are provided with historical data relating to sensed machine parameters. The present invention then uses the historical data to diagnose failures, predict failures, and evaluate machine and/or operator performance.

Other aspects, objects, and advantages of this invention can be obtained from a study of the drawings, the disclosure, and the appended claims.

What is claimed is:

1. An apparatus for predicting a fault condition, comprising:

a machine having a plurality of parameters being dependent upon machine performance;

a sensor connected to the machine and adapted to produce an electrical signal in response to one of the plurality of machine parameters;

means for producing a data trend of the parameter in response to the electrical signal;

means for calculating a confidence value of the machine parameter, the confidence value representing the degree of certainty that a failure has been detected;

means for assigning a weight to the machine parameter, the weight representing the degree of certainty that the machine parameter is the root cause of the failure;

means for multiplying the confidence value by the associated weight of the parameter value; and means for comparing the overall confidence value to a plurality of limit values where each limit value is associated with a particular parameter, and determining the cause of the failure in response to the overall confidence value corresponding to a particular set of limit values.

2. An apparatus, as set forth in claim 1, including a channel that includes one or more machine parameters.

3. An apparatus, as set forth in claim 1, including the step of determining an overall confidence value includes the step of multiplying the confidence value of each sensed parameter by the associated parameter weighting value, then combining the associated product of each sensed parameter, the overall confidence value representing the degree of certainty that a failure has been detected by the particular channel.

4. An apparatus, as set forth in claim 1, including a plurality of channels each including one or more machine parameters.

5. An apparatus, as set forth in claim 1, including the step of comparing the actual value of the sensed parameter to the associated general trend of the parameter and determining a delta value of the sensed parameter in response to the difference between the actual value and the general trend.

6. An apparatus, as set forth in claim 1, including the step of determining whether the delta value is within an upper and lower set of limits, and determining the parameter confidence value in response to the delta value of the machine parameter exceeding either the upper or lower set of limits.

* * * * *